US011032006B2

(12) United States Patent
Ye et al.

(10) Patent No.: US 11,032,006 B2
(45) Date of Patent: Jun. 8, 2021

(54) METHOD, DEVICE, APPARATUS FOR OPTICAL COMMUNICATION AND COMPUTER READABLE STORAGE MEDIUM

(71) Applicant: Nokia Solutions and Networks Oy, Espoo (FI)

(72) Inventors: Chenhui Ye, Shanghai (CN); Xiaofeng Hu, Shanghai (CN); Kaibin Zhang, Shanghai (CN)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/933,086

(22) Filed: Jul. 20, 2020

(65) Prior Publication Data
US 2021/0021346 A1 Jan. 21, 2021

(30) Foreign Application Priority Data

Jul. 19, 2019 (CN) .......................... 201910655554.8

(51) Int. Cl.
*H04B 10/27* (2013.01)
*H04Q 11/00* (2006.01)

(52) U.S. Cl.
CPC ..... *H04B 10/27* (2013.01); *H04Q 2011/0088* (2013.01)

(58) Field of Classification Search
CPC .......................... H04B 10/27; H04Q 2011/0088
USPC .......................................................... 398/58
See application file for complete search history.

(56) References Cited

U.S. PATENT DOCUMENTS

| 10,834,485 | B2* | 11/2020 | Schmalen | G06N 3/063 |
| 10,834,486 | B2* | 11/2020 | Cooper | H04L 41/12 |
| 2009/0123154 | A1* | 5/2009 | Dalton | H04Q 11/0067 398/98 |
| 2012/0315040 | A1* | 12/2012 | Dahlfort | H04J 14/0267 398/58 |
| 2016/0294620 | A1* | 10/2016 | Bang | H04L 41/0816 |
| 2017/0324507 | A1* | 11/2017 | Wan | H04B 10/077 |
| 2020/0092622 | A1* | 3/2020 | Oh | H04L 47/6275 |

* cited by examiner

*Primary Examiner* — Dalzid E Singh
(74) *Attorney, Agent, or Firm* — Fay Sharpe LLP

(57) ABSTRACT

Embodiments of the present disclosure relate to a method, a device, an apparatus for optical communication and computer-readable medium. The method comprises receiving, at an optical line terminal, an access request from a first optical network unit; in accordance with a determination that the first optical network unit is not registered at the optical line terminal, obtaining a first parameter set from the first optical network unit, and updating an association relationship between a distorted signal received at the optical line terminal and an original signal recovered from the distorted signal, based on the first parameter set. In this way, regarding different levels of optical signal quality attenuation caused by optical network units with different channel responses in one passive optical network, a unified signal compensation scheme can be provided for all optical network units, in order to mitigate transmission distortion of signals on an uplink of optical communication and significantly reduce configuration overheads in practice.

20 Claims, 8 Drawing Sheets

METHOD, DEVICE, APPARATUS FOR OPTICAL COMMUNICATION AND COMPUTER READABLE STORAGE MEDIUM

FIELD

Embodiments of the present disclosure relate to the field of optical communication, and more specifically, to a method, a device, an apparatus for optical communication and a computer-readable storage medium.

BACKGROUND

In recent years, in optical or wireless communication, neural network (NN) based signal processing have gradually become regarded as a promising signal processing method with some noticeable performance superiority over traditional signal processing methods like linear least mean square.

NN based machine learning is capable of extracting and learning certain features in a specific transmission channel and accordingly compensating it in a supervised manner. Feedforward neural network (FF-NN), recurrent neural network (RNN) and convolutional neural network (CNN) are among the top few well-known types of neural networks.

SUMMARY

In general, the embodiments of the present disclosure relate to a method, device, and apparatus for optical communication and a computer-readable storage medium.

In a first aspect of the present disclosure, a method for optical communication is provided. The method comprises receiving, at an optical line terminal, an access request from a first optical network unit. The method further comprises, in accordance with a determination that the first optical network unit is not registered at the optical line terminal, obtaining a first parameter set from the first optical network unit. The first parameter set comprises: a first distorted signal sequence and a first property parameter indicating at least one property of the first optical network unit, the first distorted signal sequence being generated from a first signal sequence transmitted via an uplink from the first optical network unit to the optical line terminal, after the transmission. In addition, the method further comprises updating, based on the first parameter set, an association relationship between a distorted signal received at the optical line terminal and an original signal recovered from the distorted signal. The association relationship is determined based on a second parameter set from a second optical network unit, the second optical network unit being different from the first optical network unit.

In a second aspect of the present disclosure, a device for optical communication is provided. The device includes at least one processor, and a memory coupled to the at least one processor, the memory including instructions stored thereon, which, when executed by the at least one processing unit, cause the device to perform the method according to the first aspect.

In a third aspect of the present disclosure, an apparatus for optical communication is provided. The apparatus comprises means for receiving, at an optical line terminal, an access request from a first optical network unit. The apparatus further comprises a means for, in accordance with a determination that the first optical network unit is not registered at the optical line terminal, obtaining a first parameter set from the first optical network unit. The first parameter set comprises: a first distorted signal sequence and a first property parameter indicating at least one property of the first optical network unit, the first distorted signal sequence being generated from a first signal sequence transmitted via an uplink from the first optical network unit to the optical line terminal, after the transmission. In addition, the apparatus further comprises means for updating an association relationship between a distorted signal received at the optical line terminal and an original signal recovered from the distorted signal, based on the first parameter set. The association relationship is determined based on a second parameter set from a second optical network unit, the second optical network unit being different from the first optical network unit.

In a fourth aspect, a computer-readable medium is provided. The computer-readable medium includes instructions stored thereon which, when executed by at least one processing unit, cause the at least one processing unit to be configured to perform the method according to the first aspect.

It should be understood that what is described in the summary is neither intended to limit the key or essential features of exemplary embodiments of the present disclosure, nor to limit the scope of the present disclosure. Other features of the present disclosure will become apparent through the following description.

BRIEF DESCRIPTION OF THE DRAWINGS

The foregoing and other features, benefits, and aspects of various embodiments of the present disclosure will be apparent from the following detailed description with reference to the accompanying drawings, in which the same or similar reference signs are used to indicate the same or similar elements, in which.

Throughout the drawings, the same or similar reference signs represent the same or similar elements.

DETAILED DESCRIPTION OF EMBODIMENTS

The principles and spirit of the present disclosure will now be described below with reference to several example embodiments shown in the accompanying drawings. It should be understood that these specific embodiments are only described for enabling those skilled in the art to better understand and implement the present disclosure, rather than limiting the scope of the present disclosure in any way.

As used herein, the terms "comprise", "include" and variants thereof are intended to be inclusive, i.e. "including but not limited to". The term "based on" is intended to include "based at least in part on". The term "one embodiment" or "the embodiment" is intended to include "at least one embodiment". The terms "first", "second" and so on can refer to the same or different objects. The following description may also include other explicit and implicit definitions.

As used herein, the term "determine" covers various kinds of actions. For example, "determine" may comprise operation, calculation, processing, deriving, investigation, lookup (e.g., lookup in a table, database or another data structure), ascertaining, etc. In addition, "determine" may comprise receiving (e.g., receiving information), accessing (e.g., accessing data in a memory), etc. Furthermore, "determine" may comprise parsing, choosing, selecting, establishing, etc.

The term "circuitry" used herein refers to one or more or all of the following: (a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions; and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all use cases of this term in this application (including in any claims). As a further example, the term "circuitry" used herein also covers an implementation of merely a hardware circuit or a processor (or multiple processors), or a portion of a hardware circuit or a processor, and its (or their) accompanying software and/or firmware. The term "circuit" also covers, for example, and if applicable to a particular claim element, a baseband integrated circuit or a processor integrated circuit, or OLT, DPU or similar integrated circuits in other computing devices.

Figure 1:
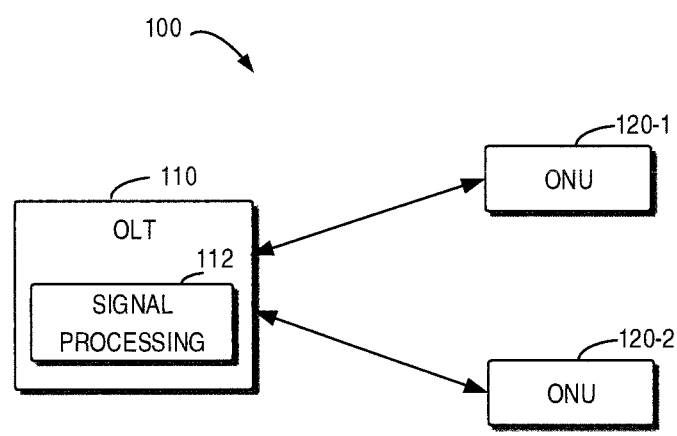
FIG. 1 is a schematic view of a communication system 100 in which the embodiments described in the present disclosure may be implemented.

FIG. 1 is a schematic view of a communication system 100 in which the embodiments described in the present disclosure may be implemented. As shown in FIG. 1, the communication system 100 comprises an optical line terminal (OLT) 100 and optical network units (ONUs) 120-1 and 120-2 (referred to as an ONU 120 as a whole below). As depicted, communication can be performed between the OLT 110 and the ONU 120. For example, between the OLT 110 and the ONU 120, data transmission can be performed through an uplink from the ONU 120 to the OLT 110 and also through a downlink from the OLT 110 and the ONU 120. It should be understood that although FIG. 1 shows two ONUs 120, the communication system 100 may comprise any number of ONUs 120.

As seen from FIG. 1, the OLT 110 comprises a signal processing device 112, which is a neural network (NN) based signal processing apparatus for example. In the communication system 100 described herein, regarding a plurality of ONUs 120, all ONUs 120 may share a signal processing apparatus at the OLT 110.

As described above, in optical or wireless communication, NN based signal processing has gradually become regarded as a promising signal processing method with some noticeable performance superiority over traditional signal processing methods like linear least mean square. NN based machine learning is capable of extracting and learning certain features in a specific transmission channel and accordingly compensating it in a supervised manner. Accordingly, at the OLT, a distorted signal received via the uplink from the ONU to the OLT can be recovered to an original signal, and the association between the distorted signal and the original signal can be determined, such that the transmission reliability can be improved.

However, a dedicatedly or ONU trained NN for signal equalization is found to be only effective for that specific end-to-end transmission link, and therefore lacks universality. For example, an NN trained for the ONU 120-1 might not fit the ONU 120-2, because the ONU 120-1 and the ONU 120-2 have different hardware configuration parameters. Therefore, in existing solutions, the OLT is required to reconfigure and reload the NN parameters frequently on each and every ONU's burst slot in uplink, which causes problems like a significant increase in extra overheads, the complexity and operational delay of a digital signal processor in real practice.

In view of this, the embodiments of the present disclosure provide a communication method for a passive optical network. With the embodiments of the present disclosure, the OLT can train the NN based signal processing device 112 based on property parameters of each ONU, such that the signal processing device 112 is applicable to all ONUs in the network. In this way, for a signal transmitted from any ONU, the OLT can adjust it through a trained NN and thereby obtain an original signal recovered on the basis of a distorted signal.

Figure 2:
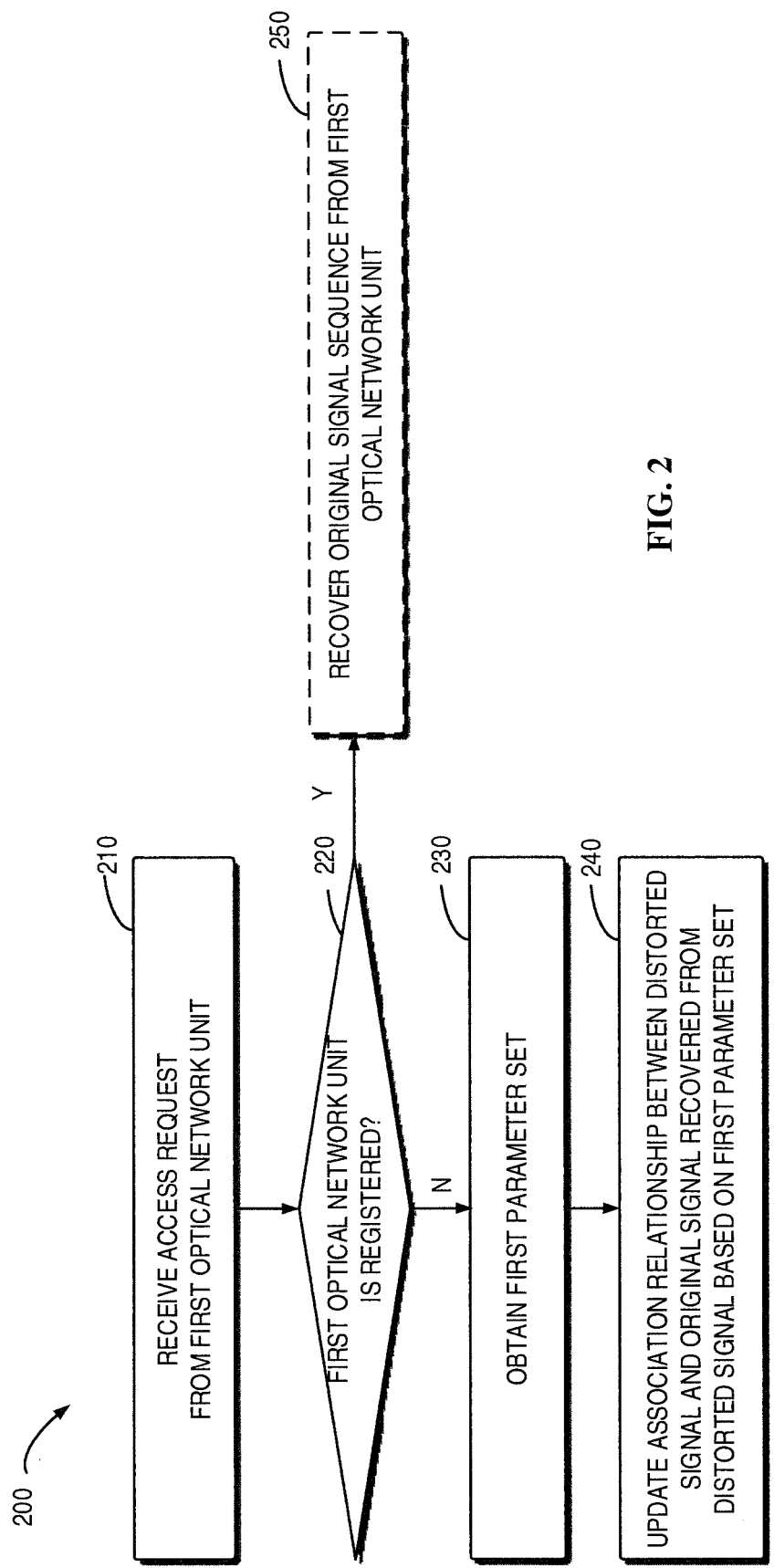
FIG. 2 shows a flowchart of a method 200 for optical communication according to some embodiments of the present disclosure.

FIG. 2 shows a flowchart of a communication network 200 according to embodiments of the present disclosure. In some embodiments, the method 200 may be implemented by the OLT 110, for example, by the signal processing device 112 of the OLT 110. In other embodiments, the method 200 may also be implemented by a computing device that is independent of the OLT 110. For the sake of discussion, the method 200 will be discussed in conjunction with FIG. 1.

The communication system 100 comprises a predetermined number of ONUs, e.g., may comprise 32 or 64 ONUs. The OLT 110 may determine whether it can see all ONUs in the communication system 100. If the OLT 110 may determine that all ONUs in the system are visible, then the OLT 110 can determine that its neural network for signal processing or its neural network based signal processing device 112 has been well trained. That is, the neural network can be directly used for signal equalization or compensation to obtain a signal before distortion.

If the OLT 110 determines that not all ONUs in the system are visible, then the OLT 110 will determine based on an access request from an ONU whether a neural network training procedure is to be performed or the neural network is used for signal equalization or compensation. This depends on whether the ONU that has sent the access request has been registered at the OLT 110.

The term "neural network", as used herein, can be such understood as a machine learning model that can learn the association between corresponding input and output from training data and thereby after completion of the training, process a given input based on a parameter set obtained from the training to generate a corresponding output. The "neural network" may sometimes also be referred to as a "learning network," "learning model," "network" or "model." These terms may be used interchangeably herein.

At 210, the OLT 110 receives an access request from a first optical network unit (which will take the ONU 120-1 in FIG. 1 as an example below). At 220, the OLT 110 determines whether the ONU 120-1 has been registered at the OLT 110.

In some embodiments, the OLT 110 may obtain an identifier of the ONU 120-1 from the access request. Based on the identifier, the OLT 110 may determine a registration state of the ONU 120-1.

In some embodiments, if the OLT 110 determines that the ONU 120-1 has not been registered at the OLT 110, then at 230, the OLT 110 obtains a first parameter set from the ONU 120-1. The first parameter set comprises a first distorted signal sequence first distorted signal sequence being generated from a first signal sequence transmitted via an uplink from the ONU 120-1 to the OLT 110, after the transmission.

In some embodiments, the first property parameter may be a center wavelength of the ONU 120-1, a transmitting bandwidth of the ONU 120-1 or a fiber length from the ONU 120-1 to the OLT 110. In some embodiments, the first property parameter may further comprise driving current at the ONU 120-1, etc.

In some embodiments, the first parameter set may be included in the access request from the ONU 1201. When the OLT 110 determines that the ONU 120-1 has not been registered at the OLT 110, the OLT 110 may obtain the first parameter set from the access request.

Optionally, in some embodiments, if the OLT 110 determines that the ONU 120-1 has not been registered at the OLT 110, the OLT 110 may send a parameter request to the ONU 120-1 to instruct the ONU 120-1 to provide the first parameter set to the OLT 110.

At 240, the OLT 110 updates an association relationship between a received distorted signal and an original signal recovered from the distorted signal according to the first parameter set. The term "association relationship" used herein may be understood as the above association between input and output of the neural network for signal processing. Therefore, updating the association relationship may be understood as further training the existing neural network based on a new inputted parameter. The updated association relationship may be regarded as the association between input and output of the further trained neural network.

Figure 4:
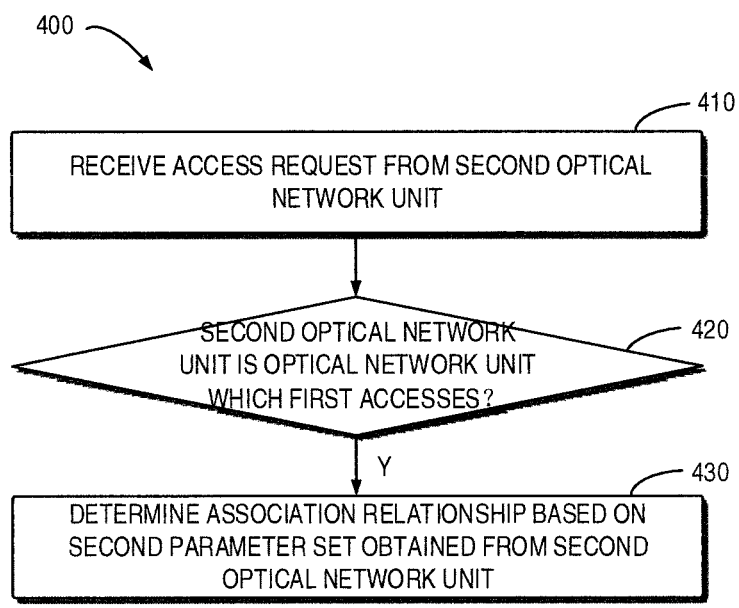
FIG. 4 shows a flowchart of a method 400 for optical communication according to some embodiments of the present disclosure.

The association relationship may be determined, for example, based on a parameter set from other ONU (e.g., the ONU 120-2 in FIG. 1) which has been registered at the OLT 110 or has performed communication with the OLG 110. The procedure of determining the association relationship will be described in detail with reference to FIG. 4, which is not detailed here.

In some embodiments, the OLT 110 may obtain a second parameter set of other ONUs (e.g., the ONU 120-2 in FIG. 1) or part thereof. The second parameter set may be saved in a database of historical training parameter samples of the neural network of the OLT 110.

The OLT 110 may disrupt the order of parameters from the second parameter set and the first parameter set. This procedure may be regarded as scrambling parameters in the parameter sets. The OLT 110 may determine an original first signal sequence transmitted from the ONU 120-1 recovered from a first distorted signal sequence received at the OLT 110, based on scrambled parameters from the second parameter set and the first parameter set and the existing association relationship.

The OLT 110 may determine the calibrated association relationship based on the first distorted signal sequence and the recovered original first signal sequence. The OLT 110 may cause the existing association relationship, i.e., the association relationship determined based on a parameter set from other ONUs (e.g., the ONU 120-2 in FIG. 1), to be updated based on the calibrated association relationship. The updating the association relationship, i.e., the procedure of training the neural network can be better understood through embodiments shown in FIGS. 3A and 3B.

Figure 3A:
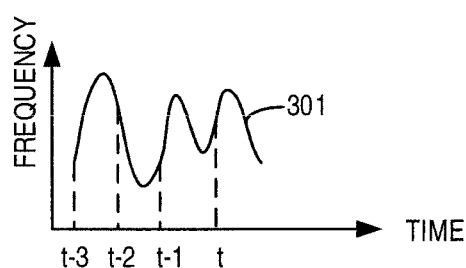
FIGS. 3A and 3B each shows a schematic view of signal processing according to some embodiments of the present disclosure.
Figure 3B:
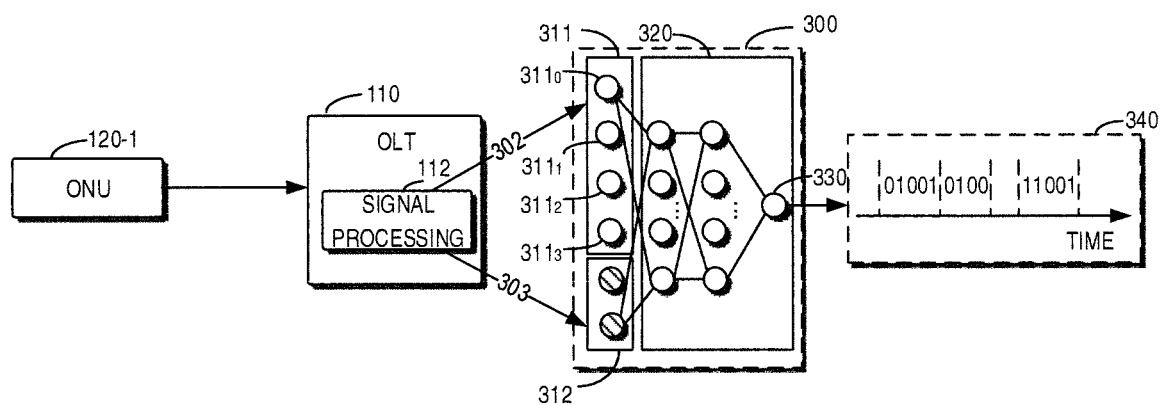

FIGS. 3A and 3B each shows a schematic view of signal processing performed by some embodiments of the present disclosure. With reference to FIGS. 3A and 3B, further detailed illustration is presented below of the principles and procedure of recovering a distorted signal by a neural network for signal processing with the method shown in FIG. 2.

FIG. 3A shows an example curve 301 of an uplink signal transmitted from the ONU 120-1 in FIG. 3B. In this figure, the OLT 110 may convert an optical signal into an electrical signal through its signal processing device 112 to quantize the signal. After the conversion, the uplink signal may be inputted 302 to an input layer 311 of a neural network 300 at a signal sequence at sampling points of time t, time t−1, time t−2 and time t−3. For example, the sampling points may be inputted to nodes 3110 to 3113, respectively.

Besides the uplink signal, the ONU 120-1 further sends to the OLT 110 a property parameter that indicates at least one property of the ONU 120-1. The property parameter may be inputted to a node 312 at the input layer 311 of the neural network 300 by the signal processing device 112.

A training layer 320 in the neural network 300 may train an existing training model through the inputted parameter, i.e., signal sequence and the property parameter. The existing training model may comprise historical training parameter samples from other ONUs (ONU 120-2 taken as an example below). One ONU may require tens or hundreds of sample sequences. Since there are typically 32 or 64 ONUs in one passive optical network, to train the universal neural network, the database will select a full data set covering data of all existing ONUs and have them scrambled before training the universal neural network. The reason for scrambling the training data set is to guarantee the universality of the universal neural network for all pre-seen ONUs. It should be noted that, even if not all ONUs have been seen, the universal neural network still has some extension capability to unseen ONUs. An example database comprising historical training parameter samples is shown in a table below.

TABLE 1

| Example Training Parameter Samples in Database | | |
|---|---|---|
| | Property Parameter | 19 km; 17 GHz @3 dB-BW; 1550.2 nm |
| ONU 120-2 | First signal sample as received | −.923 −.123 +.432 +.654 +.101 . . . |
| | Second signal sample as received | −.235 +120. +.645 +.901 +.403 . . . |
| | Nth signal sample as received | . . . |

In the training procedure, the neural network 300 may call historical training parameter samples in the databases and scramble them. Next, the neural network 300 re-trains the neural network model in conjunction with scrambled historical training parameter samples, the signal sequence transmitted from the ONU 120-1 and the property parameter. The data construction for the neural network model may be shown in a table below.

TABLE 2

Example Input Parameters and Target Outputs of Universal Neural Network

| x-1 | x-1-1 | x-1-2 | x-1-3 | x-1-4 | x-1-5 | x-1-6 | ... |
|---|---|---|---|---|---|---|---|
| S(t) | −.923 | −.123 | +.432 | +.654 | +.101 | −.322 | ... |
| S(t−1) | −.123 | +.432 | +.654 | +.101 | −.322 | −.011 | ... |
| S(t−2) | +.432 | +.654 | +.101 | −.322 | −.011 | −.543 | ... |
| S(t−3) | +.654 | +.101 | −.322 | −.011 | −.543 | −.121 | ... |
| Fiber Length | 19/A | 19/A | 19/A | 19/A | 19/A | 19/A | ... |
| Bandwidth | 17/B | 17/B | 17/B | 17/B | 17/B | 17/B | ... |
| Wavelength | 1550.2/C | 1550.2/C | 1550.2/C | 1550.2/C | 1550.2/C | 1550.2/C | ... |
| Target Output | 1 | 0 | 1 | 1 | 0 | 0 | ... |

Take historical training parameter samples in Table 1 as an example. The received and quantized signal sequence is like '−0.923; −0.123; +0.432; +0.654; +0.101 . . . ', and the extracted key properties are like 19 km, 17 GHz @3 dB-BW, optical carried centered at 1550.2 nm. The signal sequence is reshaped into the data form as shown in Table 2, wherein S(t), S(t−1), S(t−2) and S(t−3) are sample rows. "Fiber length," "wavelength" and "bandwidth" rows are normalized property parameters. The name x-y-z is defined as: ONU id+signal sequence index+neural network inputted parameter batch index.

Each column in Table 2 can be stored independently in the database. In the scrambling procedure, the OLT 110 may select as many columns from the database in Table 2 as possible and also may select columns for generating the database for the neural network training from other pre-seen ONUs as needed.

The training procedure may be understood as weighting a signal sampling point with the property parameter, so as to converge a distorted sampled signal to an original signal. The original signal may be outputted via an output layer 330 of the neural network 300. The recovered signal may be represented as a signal sequence 340. The re-obtained neural network model by means of the training parameters from the ONU 120-1 will be used as an updated neural network model.

Description has been presented to the procedure of training a neural network for signal processing based on the parameter set transmitted from the ONU 120-1, a historical parameter set from other ONU and the existing neural network training model (i.e., the association relationship). As mentioned above, the association relationship may be determined based on a parameter set from other ONUs (e.g., the ONU 120-2 in FIG. 1) which has been registered at the OLT 110 or has performed communication with the OLG 110. The procedure of determining the association relationship will be described in detail with reference to FIG. 4.

In extreme conditions, no ONU may have been accessed by the OLT 110. The possible procedure of establishing an initial association relationship will be described based on the extreme condition. At 410, the OLT 110 receives an access request from the ONU 120-2. At 420, the OLT 110 determines whether the ONU 120-2 is the ONU which first accesses the OLT 110. If the OLT 110 determines that the ONU 120-2 is the ONU which first accesses the OLT 110, then at 430, the OLT 110 determines an association relationship based on a second parameter set obtained from the ONU 120-2.

In some embodiments, the OLT 110 may determine from the second parameter set a second signal sequence transmitted on the uplink from the ONU 120-2 to the OLT 110 and a second property parameter indicating at least one property of the ONU 120-2.

Although no ONU has accessed the OLT 110, the OLT 110 may be provided with an initial training model established based on default configuration parameters of the optical network unit. The OLT 110 may determine the distortion level of the second distorted signal sequence received at the OLT 110, based on the second property parameter and the default configuration parameters in the initial training model.

In some embodiments, the OLT 110 may determine an original second signal sequence recovered from the second distorted signal sequence, based on the determined signal distortion level and the second distorted signal sequence. Then the OLT 110 may determine an association relationship according to the second distorted signal sequence and the original second signal sequence. The association relationship may be regarded as an initial association relationship for the further training procedure, i.e., performing the method 200 described in conjunction with FIG. 2.

If the OLT 110 determines that all ONUs in the system are visible, then it may be understood that the universal neural network for signal processing has been well trained for the OLT 110 to equalize and compensate signals transmitted from ONUs. Or the OLT 110 has not seen all ONUs in the system, whereas if the OLT determines that the ONU sending the access request has been registered, the parameter set transmitted from the ONU will no longer be used for training the universal neural network. That is, these two cases involve the using procedure of a fully or partially trained universal neural network. Now with reference to FIGS. 2 and 5, description is presented of the using procedure of the universal neural network.

By referring back to FIG. 2, in some embodiments, if the OLT 110 determines that the ONU 120-1 has been registered at the OLT 110, then at block 250, the OLT 110 may recover the first distorted signal sequence received at the OLT 110 to an original first signal sequence transmitted from the ONU 120-1, based on the association relationship (i.e., the existing universal neural network).

In some embodiments, if the universal neural network (updated association relationship) trained based on the parameter set transmitted from the ONU 120-1 is a well trained universal neural network, then the universal neural network may be directly used.

Figure 5:
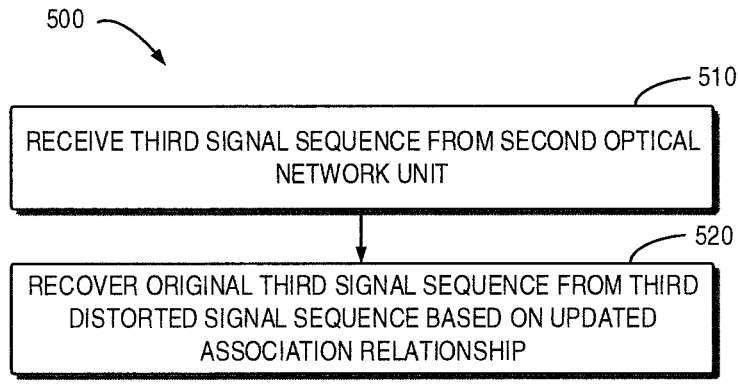
FIG. 5 shows a flowchart of a method 500 for optical communication according to some embodiments of the present disclosure.

As shown in FIG. 5, at block 510, the OLT 110 receives a third signal sequence (unlike the second signal sequence transmitted from the ONU 120-2) from the ONU 120-2. At block 520, the OLT 110 recovers the third distorted signal sequence received at the OLT 110 into an original third signal sequence transmitted from the ONU 120-2, based on the updated association relationship.

Figure 6:
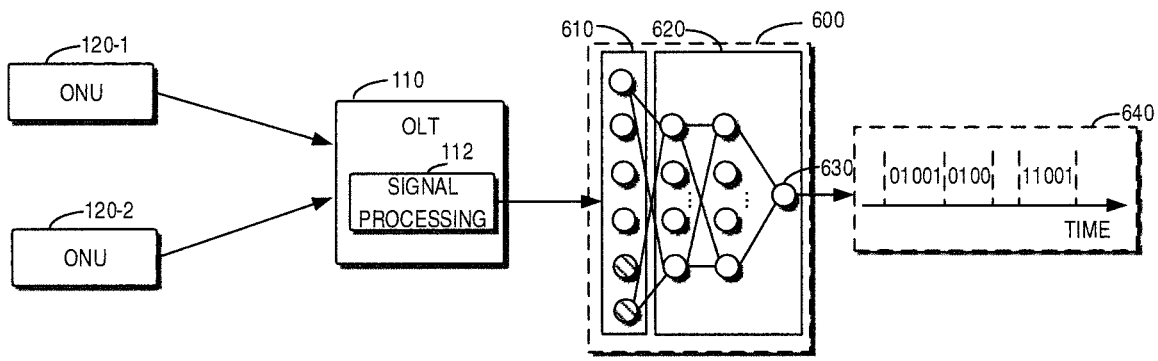
FIG. 6 shows a schematic view of signal processing according to some embodiments of the present disclosure.

If the universal neural network for signal processing has been well trained, then a schematic view that a plurality of ONUs use the universal neural network may be as shown in FIG. 6, for example, signal sequences and property parameters of the ONUs 120-1 and 120-2 may be sent to the OLT 110 so as to be processed by the signal processing device 112. Signal sequences and property parameters are provided as inputted parameters to an input layer 610 of a trained universal neural network 620. At a training layer 620, inputted parameters are weighted and converged to obtain an output 640 of an output layer 630.

In general, the embodiments of the present disclosure provide a universal neural network with more than just signal samples as inputs and also including parameters indicating at least one property of an ONU, like device-bandwidth, fiber-length, or operating carrier wavelength. The introduction of hybrid parameters in the neural network can significantly improve the performance of transmission accuracy (decline BER) and allow the OLT to sustain its universal neural network parameters in processing all ONUs in a passive optical network without the need of reloading or reconfiguration of the neural network in each ONU's burst slot.

Figure 7A:
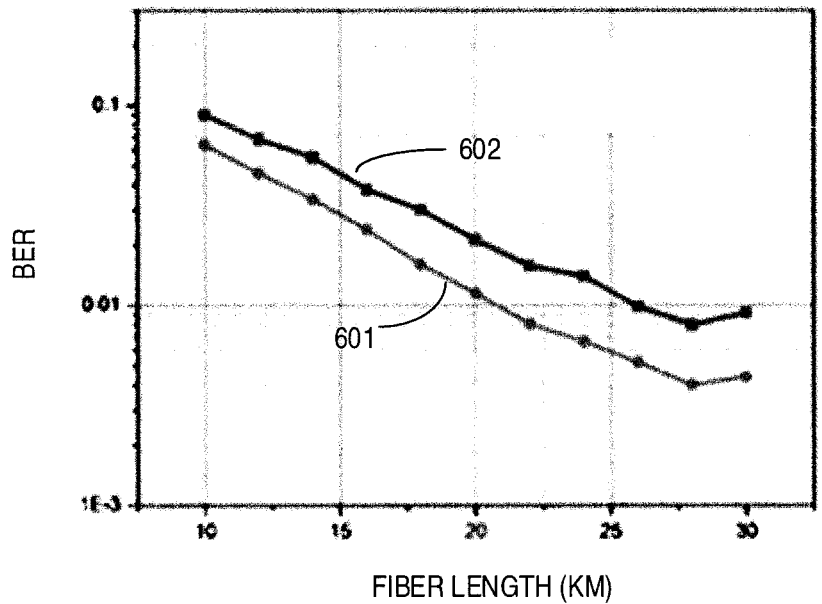
FIGS. 7A to 7C each shows a schematic view of an example experimental result obtained according to embodiments of the present disclosure.
Figure 7B:
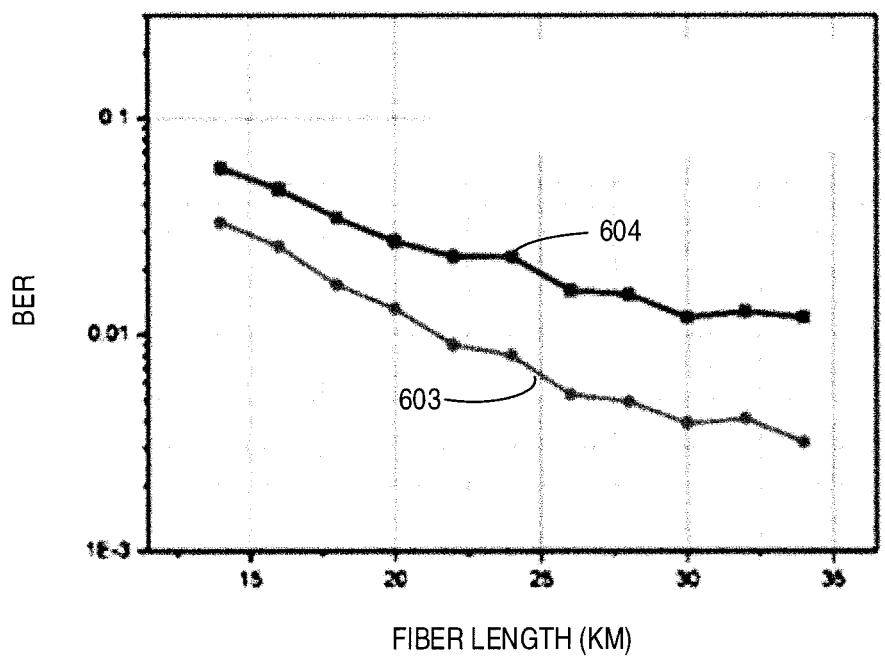
Figure 7C:
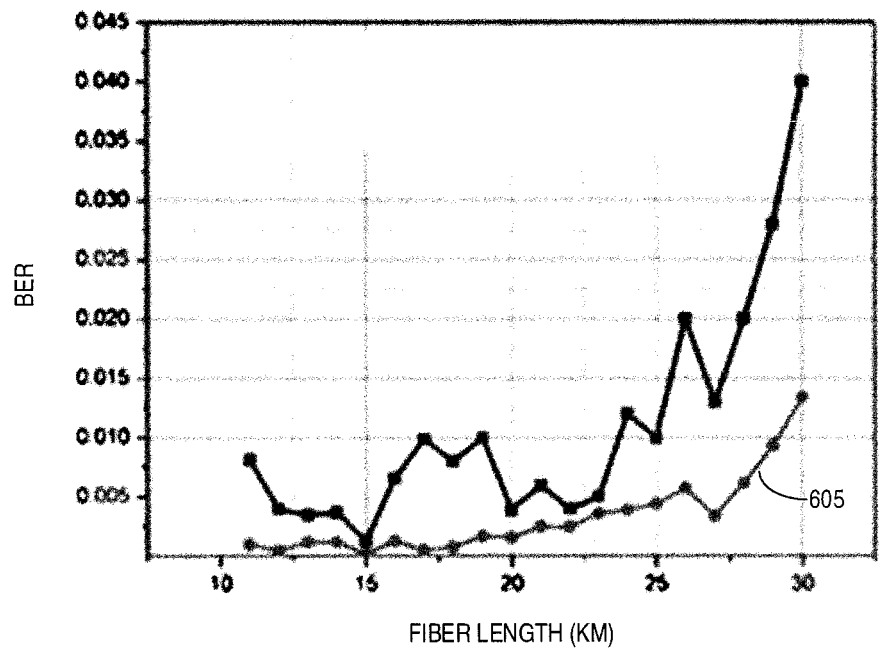

FIGS. 7A to 7C each show a schematic view of an example experimental result obtained according to embodiments of the present disclosure. Two sets of concept validation cases have been studied with the 20 ONUs with 20 sets of physical parameters randomly generated. The first set of cases uses the same device-bandwidth and diverse fiber-lengths, while the second set of cases uses both diverse device-bandwidths and fiber-lengths.

Average bit error rate (BER) curves in different study conditions are as shown in FIGS. 7A to 7C. FIG. 7A reflects the BER difference in difference conditions with (curve 601) and without (curve 602) the fiber-length. FIG. 7B reflects the BER difference in difference conditions with (curve 603) and without (curve 604) both parameters of fiber-length and device bandwidth, which clearly shows the system performance improvement of the neural network based signal processing device.

FIG. 7C shows the fluctuation of the BER diversity among the 20 ONUs. The 20 ONUs span from 11 to 30 km, and the results indicate that the BER of the channel between each ONU and the OLT has been reduced. Meanwhile, the effect among the 20 ONUs is squeezed as well. As seen from a BER curve 705 obtained with the method according to embodiments of the present disclosure, the lurch on the BER curve at 26+km end indicates that the universality will also fall within a certain limit, and for cases where the fiber length span is smaller than the test case shown here, even superior performance can be expected.

Figure 8:
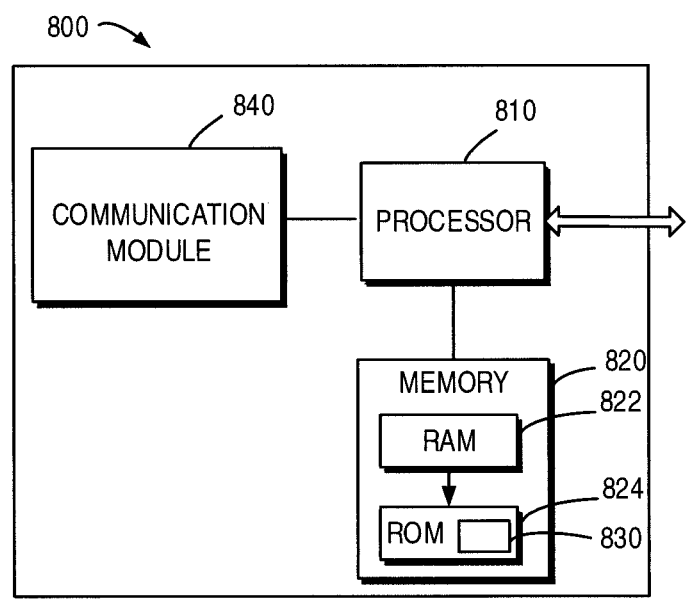
FIG. 8 shows a simplified block diagram of an electronic device 700 which is suitable for implementing the embodiments of the present disclosure.
Figure 9:
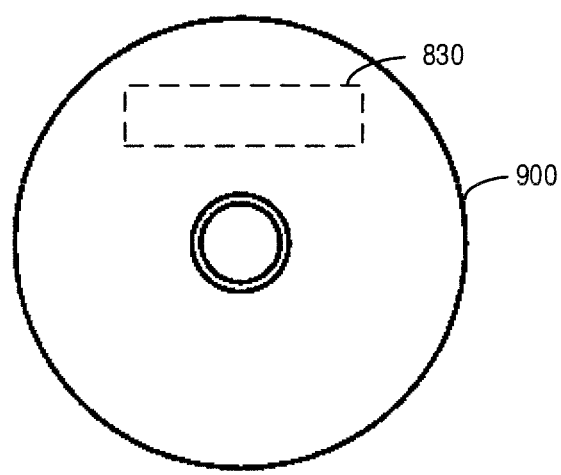
FIG. 9 shows a schematic view of a computer-readable medium which is suitable for implementing the embodiments of the present disclosure.

FIG. 8 is a simplified block diagram of a device 800 that is suitable for implementing the embodiments of the present disclosure. The device 800 may be provided to implement a communication device, for example, the OLT 110, the ONU 120-1 and the ONU 120-2 as shown in FIG. 1. As depicted, the device 800 includes one or more processors 810, one or more memories 840 coupled to the processor 810, and one or more transmitters and/or receivers (TX/RX) 840 coupled to the processor 810.

The TX/RX 840 is used for two-way communication. The TX/RX 840 has at least one antenna for facilitating communication. The communication interface may represent any interface necessary for communication with other network elements.

The processor 810 may be of any type suitable to the local technical environment, and may include one or more of the following: general-purpose computers, special-purpose computers, microprocessors, digital signal controllers (DSPs), and processors based multicore processor architecture. The device 800 may include multiple processors, such as an application specific integrated circuit chip that is slaved in time to a clock which synchronizes the main processor.

The memory 820 may include one or more non-volatile memories and one or more volatile memories. Examples of non-volatile memory include, but are not limited to, a read only memory (ROM) 824, an electrically programmable ROM (EPROM), a flash memory, a hard disk, a compact disk (CD), a digital video disk (DVD), and other magnetic storage and/or optical storage devices. Examples of the volatile memories include, but are not limited to, a random access memory (RAM) 822 and other volatile memories that will not last in the power-down duration.

A computer program 830 includes computer-executable instructions that are executed by the associated processor 810. The program 830 may be stored in the ROM 820. The processor 810 may perform any suitable actions and processing by loading the program 830 into the RAM 822.

The embodiments of the present disclosure may be implemented by means of the program 830, such that the device 800 may perform any process of the disclosure as discussed with reference to FIGS. 2 to 6. The embodiments of the present disclosure may also be implemented by hardware or by a combination of software and hardware.

In some embodiments, the program 830 may be tangibly contained in a computer readable medium, which may be included in the device 800 (such as in the memory 820) or other storage devices that are accessible by the device 800. The device 800 may load the program 830 from the computer readable medium to the RAM 822 for execution. The computer readable medium may include any type of tangible non-volatile storage, such as a ROM, an EPROM, a flash memory, a hard disk, a CD, a DVD, and the like. FIG. 8 shows an example of the computer readable medium 800 in the form of a CD or DVD. The computer readable medium has the program 830 stored thereon.

Generally, various embodiments of the present disclosure may be implemented in hardware or special purpose circuits, software, logic, or any combination thereof. Some aspects may be implemented in hardware, while other aspects may be implemented in firmware or software that may be executed by a controller, microprocessor, or other computing device. While various aspects of embodiments of the present disclosure are illustrated and described as block diagrams, flowcharts, or using some other pictorial representations, it is to be understood that the blocks, devices, systems, techniques, or methods described herein may be implemented in, as non-limiting examples, hardware, software, firmware, special-purpose circuits or logic, general purpose hardware or a controller or other computing devices, or some combination thereof.

The present disclosure also provides at least one computer program product tangibly stored on a non-transitory computer readable storage medium. The computer program product includes computer executable instructions, such as those included in program modules, which are executed in a device on a target real or virtual processor to implement the methods 300 to 500 as described above with reference to FIGS. 2 to 5. Generally speaking, the program modules include a routine, a program, a library, an object, a class, a component, a data structure, etc., which perform a particular task or implement a particular abstract data structure. In various exemplary embodiments, functions of the program modules may be merged or divided between the described program modules. Machine-executable instructions for program modules can be executed locally or in distributed devices. In distributed devices, the program modules may be located in both a local storage medium and a remote storage medium.

Computer program codes for implementing the method of the present disclosure may be written in one or more programming languages. These computer program codes may be provided to a processor of a general-purpose computer, a special-purpose computer, or other programmable data processing apparatus, so that the program codes, when executed by the computer or other programmable data processing apparatus, cause the functions/operations specified in the flowchart and/or block diagram to be implemented. The program codes may execute entirely on a computer, partly on a computer, as an independent software package, partly on a computer and partly on a remote computer, or entirely on a remote computer or server.

In the context of the present disclosure, the computer program codes or related data may be carried by any suitable carrier to cause a device, an apparatus, or a processor to perform various processes and operations as described above. Examples of carriers include a signal, a computer-readable medium, and the like. Examples of the signal may include an electrical signal, an optical signal, radio, sound, or propagated signals in other forms, such as a carrier wave, an infrared signal, and the like.

The computer-readable medium may be any tangible medium that contains or stores a program for or related to an instruction execution system, apparatus, or device. The computer-readable medium may be a computer-readable signal medium or a computer-readable storage medium. The computer-readable medium may include, but is not limited to, electronic, magnetic, optical, electromagnetic, infrared, or semiconductor systems, apparatuses or devices, or any suitable combination thereof. More detailed examples of the computer-readable storage medium include an electrical connection with one or multiple wires, a portable computer magnetic disk, a hard disk, a random access memory (RAM), a read-only memory (ROM), an erasable programmable ROM (EPROM or flash memory), an optical storage device, a magnetic storage device, or any suitable combination thereof.

In addition, although the operations are depicted in a particular order, this should not be construed as requiring or suggesting that such operations are required to be performed in the particular order or that all illustrated operations are required to be performed to achieve desirable results. On the contrary, the steps depicted in the flowchart may be performed in a different order. Additionally or alternatively, some steps may be omitted, a plurality of steps may be combined into one step, and/or one step may be decomposed into a plurality of steps. Further, it should be noted that features and functions of two or more apparatuses of the present disclosure may be embodied in one apparatus, and vice versa, features and functions of one apparatus may further be embodied in a plurality of apparatuses.

Although the present disclosure has been described with reference to several embodiments, it should be understood that the present disclosure is not limited to the specific embodiments disclosed herein. The present disclosure is intended to cover various modifications and equivalent arrangements included within the spirit and scope of the claims as appended.

We claim:

1. A method for optical communication, comprising:
   receiving, at an optical line terminal, an access request from a first optical network unit;
   in accordance with a determination that the first optical network unit is not registered at the optical line terminal, obtaining a first parameter set from the first optical network unit, the first parameter set comprising a first distorted signal sequence and a first property parameter indicating at least one property of the first optical network unit, the first distorted signal sequence being generated from a first signal sequence transmitted via an uplink from the first optical network unit to the optical line terminal, after the transmission; and
   updating, based on the first parameter set, an association relationship between a distorted signal received at the optical line terminal and an original signal recovered from the distorted signal, the association relationship being determined based on a second parameter set from a second optical network unit, the second optical network unit being different from the first optical network unit.

2. The method of claim 1, wherein the first property parameter comprises at least one of the following:
   a center wavelength of the first optical network unit,
   a transmitting bandwidth of the first optical network unit, and
   a fiber length from the first optical network unit to the optical line terminal.

3. The method of claim 1, further comprising:
   obtaining an identifier of the first optical network unit from the access request; and
   determining a registration state of the first optical network unit based on the identifier.

4. The method of claim 1, wherein obtaining the first parameter set comprises:
   obtaining the first parameter set from the access request.

5. The method of claim 1, wherein obtaining the first parameter set comprises:
   in accordance with a determination that the first optical network unit is not registered, transmitting a parameter request to the first optical network unit, to cause the first parameter is to be provided from the first optical network unit to the optical line terminal.

6. The method of claim 1, wherein the second optical network unit is the optical network unit which first accesses the optical line terminal, and wherein the method further comprises:
   determining, from the second parameter set, a second signal sequence transmitted via an uplink from the second optical network unit to the optical line terminal and a second property parameter indicating at least one property of the second optical network unit;
   determining, based on the second property parameter, a distortion level of a second distorted signal sequence received at the optical line terminal;

determining an original second signal sequence recovered from the second distorted signal sequence based on the signal distortion level and the second distorted signal sequence; and determining the association relationship based on the second distorted signal sequence and the original second signal sequence.

7. The method of claim 1, wherein updating the association relationship comprises:

obtaining the second parameter set;

determining an original first signal sequence transmitted from the first optical network unit and recovered from a first distorted signal sequence received at the optical line terminal, based on the second parameter set, the association relationship and the first parameter set; and determining a calibrated association relationship based on the first distorted signal sequence and the original first signal sequence; and causing the association relationship to be updated based on the calibrated association relationship.

8. The method of claim 1, further comprising:

in accordance with a determination that determining that the first optical network unit is registered at the optical line terminal, recovering, based on the association relationship, a first distorted signal sequence received at the optical line terminal into an original first signal sequence transmitted from the first optical network unit.

9. The method of claim 1, further comprising:

receiving a third distorted signal sequence from the second optical network unit; and recovering an original third signal sequence from the third distorted signal sequence based on the updated association relationship.

10. A non-transitory computer readable medium comprising program instructions for causing an apparatus to perform at least the method of claim 1.

11. A device for optical communication, comprising:

at least one processor; and at least one memory including computer program codes;

the at least one memory and the computer program codes are configured to, with the at least one processor, cause the apparatus at least to:

receive an access request from a first optical network unit;

in accordance with a determination that the first optical network unit is not registered at the optical line terminal, obtain a first parameter set from the first optical network unit, the first parameter set comprising a first distorted signal sequence and a first property parameter indicating at least one property of the first optical network unit, the first distorted signal sequence being generated from a first signal sequence transmitted via an uplink from the first optical network unit to the optical line terminal, after the transmission; and update, based on the first parameter set, an association relationship between a distorted signal received at the optical line terminal and an original signal recovered from the distorted signal, the association relationship being determined based on a second parameter set from a second optical network unit, the second optical network unit being different from the first optical network unit.

12. The device of claim 11, wherein the first property parameter comprises at least one of the following:

a center wavelength of the first optical network unit, a transmitting bandwidth of the first optical network unit, and a fiber length from the first optical network unit to the optical line terminal.

13. The device of claim 11, wherein the device is further caused to:

obtain an identifier of the first optical network unit from the access request; and determine a registration state of the first optical network unit based on the identifier.

14. The device of claim 11, wherein the device is caused to obtain the first parameter set by:

obtaining the first parameter set from the access request.

15. The device of claim 11, wherein the device is caused to obtain the first parameter set by:

in accordance with a determination that the first optical network unit is not registered, transmitting a parameter request to the first optical network unit, to cause the first parameter is to be provided from the first optical network unit to the optical line terminal.

16. The device of claim 11, wherein the second optical network unit is the optical network unit which first accesses the optical line terminal, and wherein the device is further caused to:

determine, from the second parameter set, a second signal sequence transmitted via an uplink from the second optical network unit to the optical line terminal and a second property parameter indicating at least one property of the second optical network unit;

determine, based on the second property parameter, a distortion level of a second distorted signal sequence received at the optical line terminal;

determine an original second signal sequence recovered from the second distorted signal sequence based on the signal distortion level and the second distorted signal sequence; and determine the association relationship based on the second distorted signal sequence and the original second signal sequence.

17. The device of claim 11, wherein the device is caused to update the association relationship by:

obtaining the second parameter set;

determining an original first signal sequence transmitted from the first optical network unit and recovered from a first distorted signal sequence received at the optical line terminal, based on the second parameter set, the association relationship and the first parameter set; and determining a calibrated association relationship based on the first distorted signal sequence and the original first signal sequence; and causing the association relationship to be updated based on the calibrated association relationship.

18. The device of claim 11, wherein the device is further caused to:

in accordance with a determination that determining that the first optical network unit is registered at the optical line terminal, recover, based on the association relationship, a first distorted signal sequence received at the optical line terminal into an original first signal sequence transmitted from the first optical network unit.

19. The device of claim 11, wherein the device is further caused to:

receive a third distorted signal sequence from the second optical network unit; and recover an original third signal sequence from the third distorted signal sequence based on the updated association relationship.

20. An apparatus for optical communication, comprising:

means for receiving, at an optical line terminal, an access request from a first optical network unit;

means for, in accordance with a determination that the first optical network unit is not registered at the optical line terminal, obtaining a first parameter set from the first optical network unit, the first parameter set comprising a first distorted signal sequence and a first property parameter indicating at least one property of the first optical network unit, the first distorted signal sequence being generated from a first signal sequence transmitted via an uplink from the first optical network unit to the optical line terminal, after the transmission; and means for updating, based on the first parameter set, an association relationship between a distorted signal received at the optical line terminal and an original signal recovered from the distorted signal, the association relationship being determined based on a second parameter set from a second optical network unit, the second optical network unit being different from the first optical network unit.

* * * * *